(12) United States Patent
Danilov et al.

(10) Patent No.: US 10,715,181 B2
(45) Date of Patent: *Jul. 14, 2020

(54) FACILITATION OF DATA DELETION FOR DISTRIBUTED ERASURE CODING

(71) Applicant: EMC IP Holding Company LLC, Hopkinton, MA (US)

(72) Inventors: Mikhail Danilov, Saint Petersburg (RU); Alexander Rakulenko, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/354,870

(22) Filed: Mar. 15, 2019

(65) Prior Publication Data

US 2019/0215017 A1 Jul. 11, 2019

Related U.S. Application Data

(63) Continuation of application No. 15/654,109, filed on Jul. 19, 2017, now Pat. No. 10,284,234.

(51) Int. Cl.
*H03M 13/37* (2006.01)
*G06F 21/60* (2013.01)
(Continued)

(52) U.S. Cl.
CPC .......... *H03M 13/373* (2013.01); *G06F 3/065* (2013.01); *G06F 3/0614* (2013.01);
(Continued)

(58) Field of Classification Search
CPC ............... H03M 13/373; G06F 21/602; G06F 17/30117; G06F 3/0614; G06F 3/0617;
(Continued)

(56) References Cited

U.S. PATENT DOCUMENTS 5,841,793 A 11/1998 Fukuda
7,650,558 B2 1/2010 Rosenbluth et al.
(Continued)

OTHER PUBLICATIONS

Notice of Allowance received for U.S. Appl. No. 15/654,109 dated Dec. 21, 2018, 41 pages.
(Continued)

*Primary Examiner* — John J Tabone, Jr.
(74) *Attorney, Agent, or Firm* — Amin, Turocy & Watson, LLP

(57) ABSTRACT

Although a distributed storage device can recover data from multiple failures this process produces excessive inter-zone network traffic when a chunk with user data is deleted. This disclosure employs an un-encoding erasure coding and partial coding chunks to facilitate data deletes while reducing inter-zone network traffic. Therefore a data chunk representative of partitioned disk space associated with a first zone of a data store can be determined to be marked for deletion. Consequently, the data chunk can be copied, resulting in a copied data chunk, to a second zone of the data store associated with a coding chunk comprising the data chunk. Based on the copied data chunk and the coding chunk, a partial coding chunk can be generated via un-encoding, wherein the partial coding chunk is a subset of the coding chunk.

20 Claims, 11 Drawing Sheets

(51) Int. Cl.
*G06F 3/06* (2006.01)
*G06F 11/10* (2006.01)
*G06F 11/20* (2006.01)
*G06F 16/16* (2019.01)

(52) U.S. Cl.
CPC .......... *G06F 3/0617* (2013.01); *G06F 3/0619* (2013.01); *G06F 11/10* (2013.01); *G06F 11/1004* (2013.01); *G06F 11/1032* (2013.01); *G06F 11/2056* (2013.01); *G06F 11/2058* (2013.01); *G06F 16/162* (2019.01); *G06F 21/602* (2013.01)

(58) Field of Classification Search
CPC ........ G06F 3/0619; G06F 3/065; G06F 11/10; G06F 11/1004; G06F 11/1032; G06F 11/2056; G06F 11/2058
USPC ........ 714/752, 764, 766–770, 773, 784, 786
See application file for complete search history.

(56) References Cited

U.S. PATENT DOCUMENTS

| | | |
|---|---|---|
| 8,601,339 B1 | 12/2013 | Cypher |
| 8,788,913 B1 | 7/2014 | Xin et al. |
| 8,972,478 B1 | 3/2015 | Storer et al. |
| 8,977,660 B1 | 3/2015 | Xin et al. |
| 9,032,061 B1 | 5/2015 | Xin et al. |
| 9,158,927 B1 | 10/2015 | Franklin et al. |
| 9,704,583 B2 | 7/2017 | Song |
| 2004/0117718 A1 | 6/2004 | Manasse |
| 2006/0212782 A1 | 9/2006 | Li |
| 2007/0061684 A1 | 3/2007 | Rosenbluth et al. |
| 2007/0236508 A1 | 10/2007 | Lawler et al. |
| 2008/0221856 A1 | 9/2008 | Dubnicki et al. |
| 2011/0142055 A1 | 6/2011 | Feder et al. |
| 2012/0060072 A1 | 3/2012 | Simitci et al. |
| 2014/0052764 A1 | 2/2014 | Michael et al. |
| 2014/0068259 A1 | 3/2014 | Resch et al. |
| 2014/0310571 A1 | 10/2014 | Fetterly et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0269253 A1 | 9/2015 | Kaminura et al. |
| 2016/0380650 A1 | 12/2016 | Calder et al. |
| 2017/0161148 A1 | 6/2017 | Vairavanathan et al. |
| 2017/0300383 A1 | 10/2017 | Kato |
| 2017/0371571 A1 | 12/2017 | Danilov et al. |
| 2018/0004600 A1 | 1/2018 | Danilov et al. |
| 2018/0048333 A1 | 2/2018 | Nilsson |
| 2018/0181324 A1 | 6/2018 | Danilov et al. |
| 2018/0181466 A1 | 6/2018 | Danilov et al. |
| 2018/0181475 A1 | 6/2018 | Danilov et al. |
| 2018/0267854 A1 | 9/2018 | Ki |

OTHER PUBLICATIONS

Muralidhar et al., "f4: Facebook's Warm BLOB Storage System, 2014", USENIX Association, 2014, pp. 383-398.

FACILITATION OF DATA DELETION FOR DISTRIBUTED ERASURE CODING

RELATED APPLICATION

The subject patent application is a continuation of, and claims priority to, U.S. Patent application Ser. No. 15/654,109 (now U.S. Pat. No. 10,284,234), filed Jul. 19, 2017, and entitled "FACILITATION OF DATA DELETION FOR DISTRIBUTED ERASURE CODING," the entirety of which application is hereby incorporated by reference herein.

TECHNICAL FIELD

The subject disclosure relates generally to distributed erasure coding. More specifically, this disclosure relates to data deletion for distributed erasure coding.

BACKGROUND

Elastic Cloud Storage (ECS) uses the latest trends in software architecture and development to achieve increased availability, capacity use efficiency, and performance. ECS uses a specific method for disk capacity management. Disk space is partitioned into a set of blocks of fixed size called chunks. User data is stored in these chunks and the chunks are shared. One chunk can contain fragments of several user objects. Chunk content is modified in an append mode. When chunks become full, they are sealed and the content of sealed chunks is immutable.

A corresponding feature of ECS supports geographically distributed setups (GEO) consisting of two or more zones. When there are three or more zones, each zone may receive chunks from other zones and the zones can combine the chunks. This type of cluster based storage of several racks supports cluster nodes that communicate with each other. One cluster may be located in one data center and another cluster can be located in a remote data center. Although the geographically distributed setups can be used to provide an additional protection of user data by means of replication, the replication mechanism works at the chunks level. Therefore, this presents a scalability issue because there is no way for the geographically distributed setup to help to recover data from a dual failure or from more complicated failures.

The above-described background relating to ECS is merely intended to provide a contextual overview of some current issues, and is not intended to be exhaustive. Other contextual information may become further apparent upon review of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Example systems and methods disclosed herein relate to facilitating of data deletion for distributed erasure encoding. In one example embodiment of the specification a method that comprises determining, by a system comprising a processor, a data chunk, of data chunks representative of partitioned disk space associated with a first zone of a data store is marked for deletion. In response to the determining, the method can copy, by the system, the data chunk, resulting in a copied data chunk, to a second zone of the data store associated with a coding chunk comprising the data chunk. Additionally, based on the copied data chunk and the coding chunk, the method can generate, by the system, a partial coding chunk, wherein the partial coding chunk is a subset of the coding chunk.

Another example embodiment, as disclosed herein comprises a processor and a memory that stores executable instructions that, when executed by the processor, facilitate performance of operations. Moreover, the operations comprise receiving an indication that a data chunk of data chunks representative of apportioned disk space associated with a first zone of a data store is to be deleted. Further, the operations comprise, sending a copy of the data chunk to a second zone associated with a coding chunk comprising the data chunks in response to the receiving. Additionally, based on the copy of the data chunk and the coding chunk, the operations comprise generating a partial coding chunk without the data chunk, wherein the partial coding chunk is a subset of the coding chunk.

Another example embodiment of the specification relates to a computer-readable storage medium comprising instructions that, in response to execution, cause a server device comprising a processor to perform operations, comprising facilitating a request to delete a data chunk of data chunks, wherein the data chunk is associated with a first zone of a data store. The operations further comprise in response to the facilitating, facilitating generating a copy of the data chunk to be sent to a second zone associated with a coding chunk, wherein the coding chunk comprises the data chunks and facilitating sending the copy of the data chunk to the second zone. Additionally, the operations further comprise generating a partial coding chunk, wherein the partial coding chunk is different than the coding chunk based on an indication that the copy of the data chunk has been determined to have been received by the second zone.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
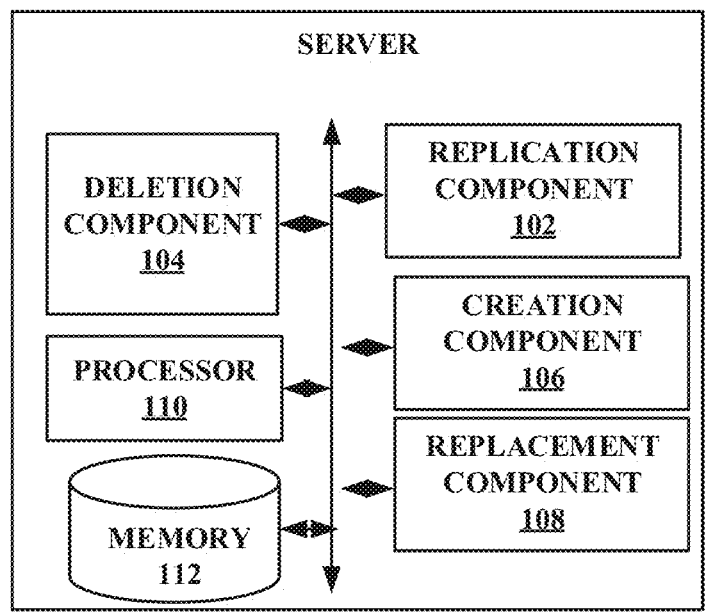
FIG. 1 illustrates an example server configured to perform distributed erasure coding.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

The term "cloud" as used herein can refer to a cluster of nodes (e.g., set of network servers), for example, within a distributed object storage system, that are communicatively and/or operatively coupled to each other, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with each other to provide resources for end-users.

Example systems and methods disclosed herein, in one or more embodiments, relate to geographically distributed (GEO) erasure coding, which inherits all the issues of GEO XOR (i.e., former ECS technique to minimize overhead) except low scalability. In particular, there is an issue with network traffic efficiency. Chunk deletion requires repeated replication of chunks, which are peers of the deleted one.

Erasure coding can be used to protect data on geographically distributed storages instead of basic XOR. Erasure coding was created as a forward error correction method for binary erasure channel. However, erasure coding can be used for data protection on data storages.

During erasure coding, a piece of data can be divided into k data fragments of equal size. During encoding, redundant m coding fragments are created so that the system can tolerate the loss of any m fragments. The process of coding fragments creation is called encoding. The process of data fragments recovery using available data and coding fragments is called decoding.

If a distributed storage must tolerate the loss of any m zones/clusters/chunks, then GEO erasure coding can begin at each zone by replicating each new chunk to at least m remote zones. As a result, there are m backup copies of each chunk. There is one primary backup copy, which will be used for encoding. Encoding is performed by one zone for primary backup chunks and other zones replicate to it. Once a zone has k primary chunks replicated from different remote zones, the zone can perform encoding using the chunks replicated to it as data fragments. The chunk size is fixed, in ECS, with padding or other data to complement, wherein the other data is added as needed. The result of encoding is m data portions of a chunk size. They are stored as chunks of a specific type called coding chunks. After encoding is complete, the zone can store one coding chunk locally and move other m−1 coding chunks to remote zones making sure all the k+m data and coding chunks are stored at different zones whenever possible. Afterwards, the primary backup chunks used for encoding and their peer backup chunks at other zones can be deleted.

A per chunk capacity overhead on GEO erasure coding can be calculated as follows:

$$o = m/k * \text{chunk\_size} \qquad \text{Equation (1)}$$

For example, if a 10+2 configuration is used, the overhead is just 0.2 of a chunk size. Afterwards, from 1 to m failures, the storage recovers all of the unavailable chunks as follows. For each unavailable chunk, k peer data chunks and corresponding coding chunks are used to perform decoding. The resulting data portion(s) is stored as a missing chunk(s). When the number of zones in a distributed storage is greater or equal to k+m and all the data and coding chunks are stored to different zones, the distributed storage is able to recover any m zone, cluster, and/or chunk failures.

This disclosure comprises a network traffic efficient system and method for handling deletes with GEO erasure coding. The distributed storage system can reduce inter-zone network traffic by combining an un-encoding erasure coding operation and partial coding chunks. The un-encoding operation can comprise a matrix-based encoding erasure coding operation represented by the equation below:

$$C_i = \Sigma_{j=1}^{k} X_{i,j} * D_j, \qquad \text{Equation (2)}$$

where $C_i$ are coding fragments, $D_j$ are data fragments, and $X_{i,j}$ are coefficients of the coding matrix. Therefore, if some data fragment $D_l$ needs to be removed, the remaining data fragments can be re-protected via updating of all the coding fragments. The coding fragments can be updated using Equation (3) below:

$$C'_i = C_i - X_{i,l} * D_l \qquad \text{Equation (3)}$$

This process to re-protect data, in the context of this disclosure, shows how un-encoding works with data and coding chunks.

The distributed storage can produce, and interchange between its zones, m partial coding chunks when one or more zones do not produce enough data chunks. Partial coding chunks are produced for l data chunks, where l<k. During encoding, missing k−l data chunks can be replaced by virtual (i.e., fake) chunks filled with zeroes. When encoding is over and the resulting partial coding chunks are distributed across different zones, the backup copies of source data chunks can be deleted. This reduces overhead capacity per chunk for distributed storage systems with bad load balance.

Thus, distributed storage can produce partial coding chunks out of complete coding chunks to handle chunk deletes, therefore allowing the distributed system to handle deletes with erasure coding using the XOR method. When there is a need to delete a data chunk, the data chunk's content is copied to m remote zones that store the coding chunks created for it. Each remote zone can use the coding chunk it stores and the copy of the data chunk to be deleted to produce a partial coding chunk via an un-encoding operation. Each zone can store the partial coding chunks it produced locally. Thereafter, it is safe to delete the chunk, its copies, and the complete coding chunks. Therefore, the delete is handled without involving peer data chunks of the chunk to delete. Note that un-encoding operations can be performed by several zones independently and in parallel to reduce inter-zone network traffic. It should be noted that although several servers can handle traffic from different clients, the aforementioned operations can be handled by just one server.

Referring initially to FIG. 1, there illustrated is an example server 100 configured to perform distributed erasure. In the embodiment shown in FIG. 1, the server 100 can comprise a deletion component 104, a replication component 102, a creation component 106, a replacement component 108, a processor 110, and a memory 112. It should also be noted that in alternative embodiments that these or other components can be external to the server 100.

Based on a request to delete data from the server 100, the deletion component 104 can initiate deletion of the data at a first zone. At other zones, the data can be in the form of a data chunk that has previously been combined with other data chunks to create a coding chunk. The creation component 106 can create coding chunks at other zones by combining various data chunks from various zones. The server 100 can also create additional data chunks at a remote zone by replicating data chunks from various other zones. It should be noted that replicating the data chunks can occur by copying the data chunks at their respective zones and then sending a copied data chunk to a remote zone, or the remote zone can be in bi-directional communication with a first zone, wherein a copy of the data chunk of the first zone is created remotely at the remote zone. It should be further noted that peer chunks can be replicated to one or more zones either simultaneously or linearly.

In order to replicate a data chunk via the replication component 102, the server 100 can create copies of all of the data chunks associated with remote zones, except the data chunk that has been marked for deletion by the deletion component 104, within the same zone as the coding chunk. Thereafter, the data chunk that was marked for deletion can be deleted and the coding chunk can be deleted via the deletion component 104. The copies of the data chunks can then be used to generate another coding chunk, minus the data chunk that was marked for deletion, via the creation component 106. Additionally, a new data chunk can be generated via the replacement component 108. The new data chunk can then be used to replace the previously deleted data chunk of the coding chunk. The creation component 106 can create a new coding chunk comprising all of the previous data chunks (minus the deleted data chunk) and the new data chunk. The new data chunk can then be shared and replicated to the first zone where the data chunk was deleted previously.

In another embodiment, based on a request to delete data from the server 100, the deletion component 104 can initiate deletion of the data at a first zone. At other zones, the data can be in the form of a data chunk that has previously been combined with other data chunks to create a coding chunk. The creation component 106 can create coding chunks at other zones by combining various data chunks from various zones. The server 100 can also create additional data chunks at a remote zone by replicating data chunks from various other zones. It should be noted that replicating the data chunks can occur by copying the data chunks at their respective zones and then sending the data chunk to a remote zone, or the remote zone can be in bi-directional communication with a first zone, wherein a copy of the data chunk of that first zone is created remotely at the remote zone.

In order to replicate a data chunk via the replication component 102, the server 100 can replicate, at the zone comprising the coding chunks, the data chunk that has been marked for deletion by the deletion component 104. Then, a new partial coding chunk can be generated by the creation component 106, wherein the partial coding chunk does not comprise the data chunk that was replicated to the zone. Thereafter, the original coding chunk and the replicated data chunk can be deleted from the zone via the deletion component 104. Additionally, a new data chunk can be generated via the replacement component 108. The new data chunk can then be used to replace the previously deleted data chunk of the partial coding chunk. The creation component 106 can create a new coding chunk comprising creating the partial coding chunk and the new data chunk. The new data chunk can then be shared and replicated to the first zone where the data chunk was deleted previously. It should be understood that procedures associated with the first embodiment according to FIG. 1 and the second embodiment according to FIG. 1, throughout the disclosure, can be combined to integrate both procedures. For instance, during a deletion process, one zone can generate partial coding chunks based on a replicated data chunk for deletion, while another zone can compare coding chunks to replicated data chunks that are not marked deleted to delete a specific chunk. These operations can be performed simultaneously or linearly. It should also be noted that a zone can be configured to execute both procedures either simultaneously or linearly.

Aspects of the processor 110 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein. In an aspect, the server 100 can also include memory 112 that stores computer executable components and instructions.

Figure 2:
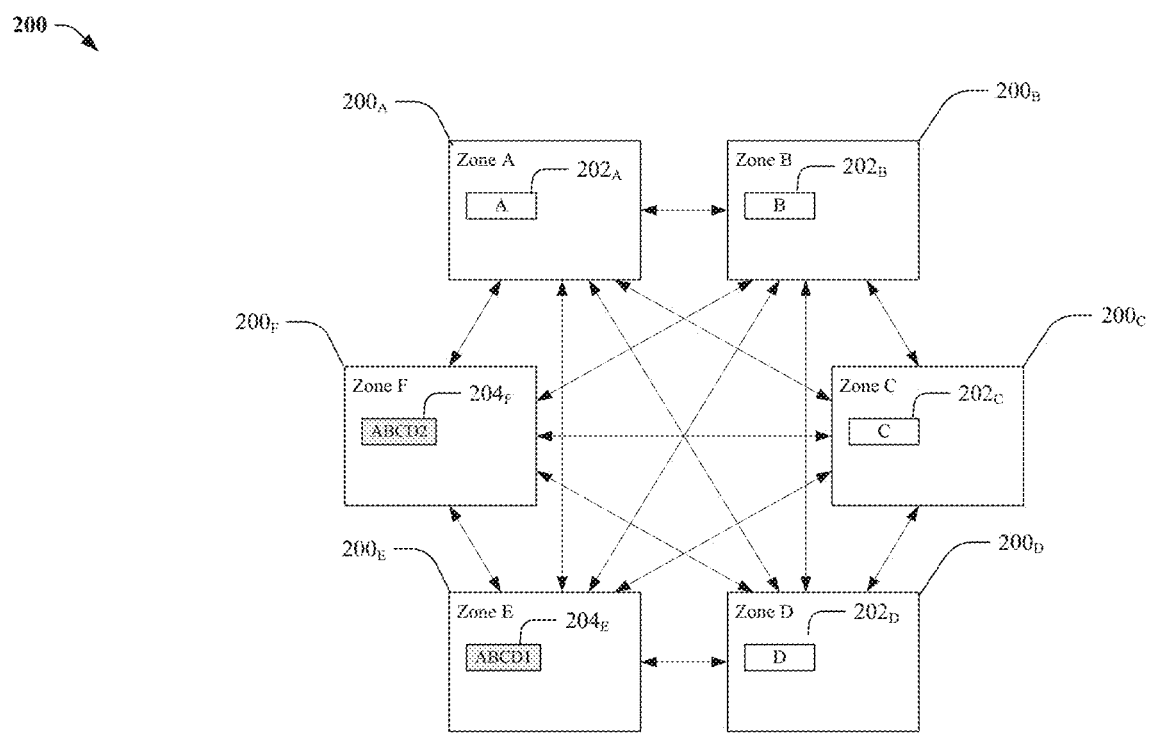
FIG. 2 illustrates an example system comprising four data chunks protected with GEO erasure coding.

Referring now to FIG. 2, there is illustrated an example system 200 comprising four data chunks protected with GEO erasure coding. There are six zones zone A $200_A$, zone B $200_A$, zone C $200_C$, zone D $200_D$, zone E $200_E$, and zone F $200_F$. There are four data chunks A $202_A$, B $202_B$, C $202_C$, and D $202_D$ stored to the zone A $200_A$, zone B $200_A$, zone C $200_C$, zone D $200_D$. The zone E $200_E$ and zone F $200_F$ store coding chunks ABCD1 $204_E$ and ABCD2 $204_F$ for the data chunks. Thus, a 4+2 erasure coding configuration can be used to delete chunk B.

Figure 3:
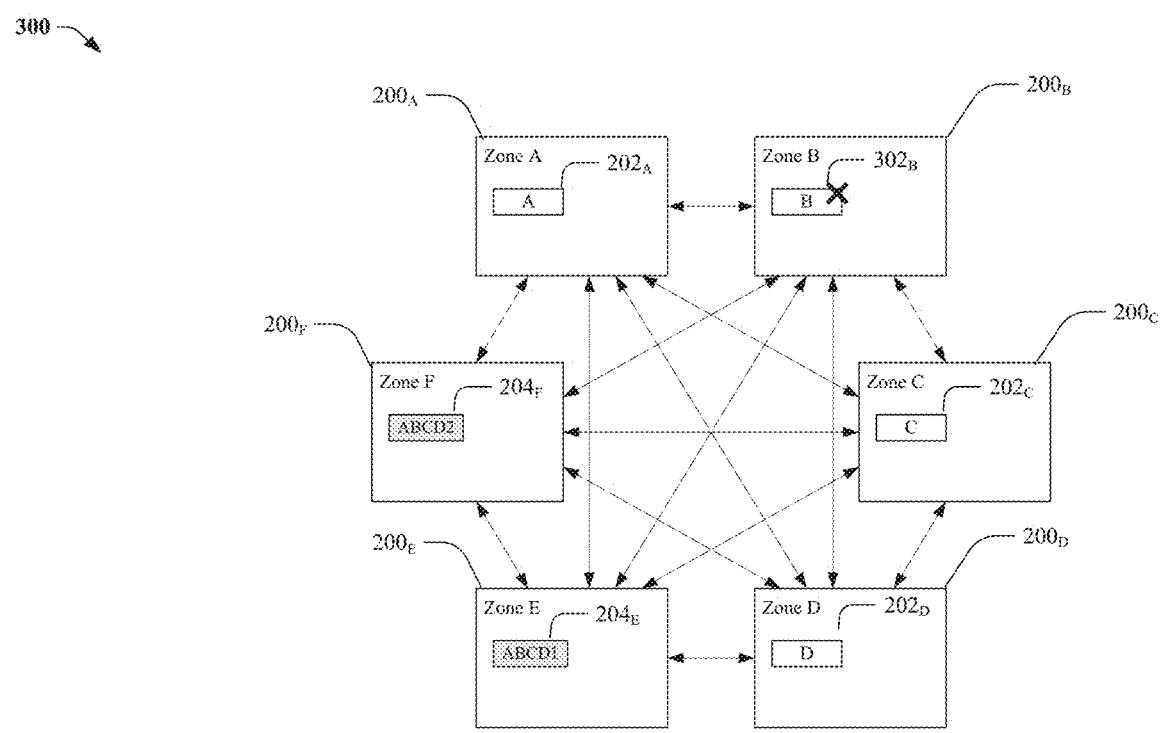
FIG. 3 illustrates an example system for a data chunk deletion.
Figure 4:
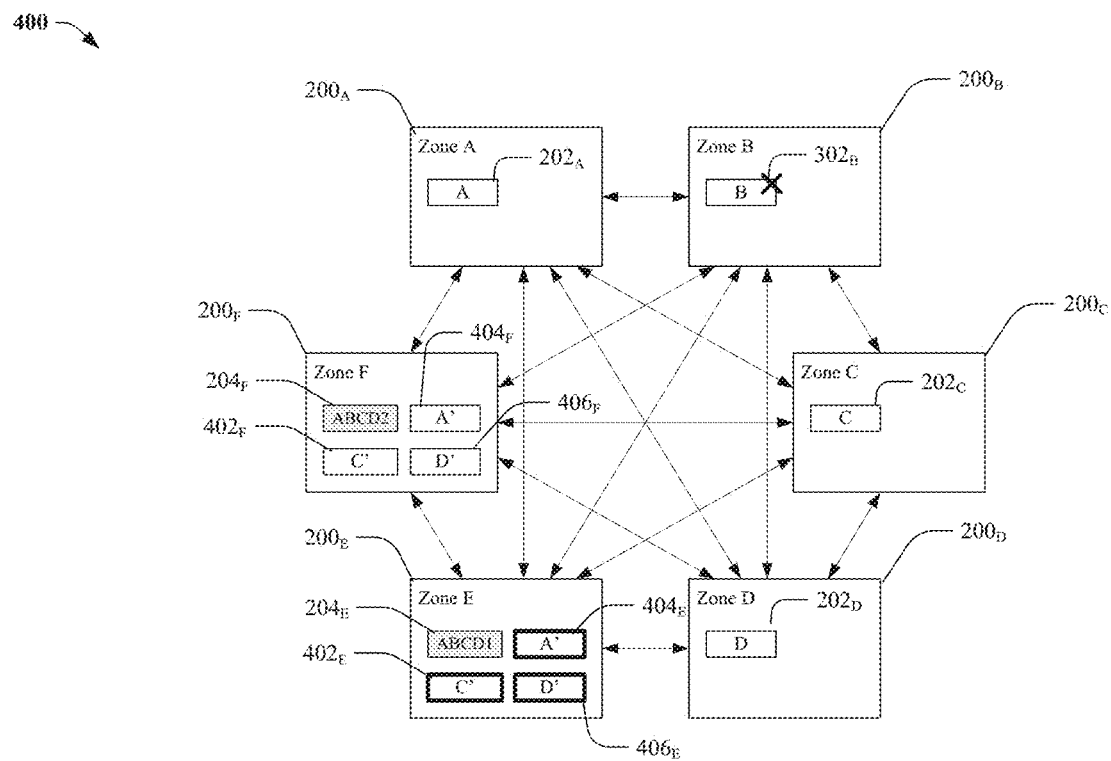
FIG. 4 illustrates an example system that facilitates repeated replication of peer chunks.

Referring now to FIGS. 3-4, FIG. 3 illustrates an example system 300 for a data chunk deletion. After deletion of chunk B $302_B$, its peer chunks, A $202_A$, C $202_C$, and D $202_D$ still need to be protected from a dual failure. FIG. 4 illustrates an example system 400 that facilitates repeated replication of the peer chunks. To protect the peer chunks A $202_A$, C $202_C$, D $202_D$, the peer chunks can be replicated to two different remote zones as A' $404_E$, C' $402_E$, and D' $406_E$ in zone E $200_E$ and as A' $404_E$, C' $402_F$, D' $406_E$, in Zone F $200_F$ once again. Thereafter chunk B $302_B$ can be deleted and the obsolete coding chunks ABCD1 $204_E$, and ABCD2 $204_E$ can be deleted.

Figure 5:
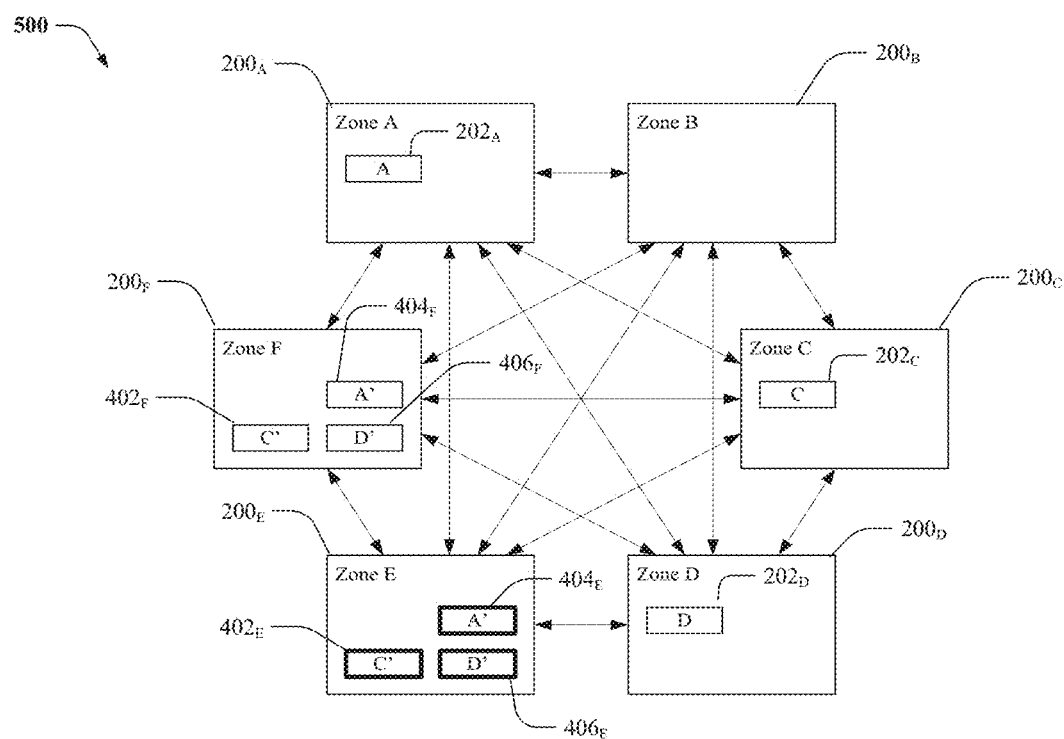
FIG. 5 illustrates an example system for data layout after deletion of a data chunk.

Referring now to FIG. 5, there illustrated is an example system 500 for data layout after deletion of a data chunk. Therefore, the geographically distributed storage can replicate six data chunks (A' $404_E$, C' $402_E$, and D' $406_E$ in Zone E $200_E$, and as A' $404_E$, C' $402_F$, D' $406_E$, in Zone F $200_F$) in order to handle deletion of one data chunk. In general, the number of chunks to replicate repeatedly can be calculated using Equation (4) below.

$$N=(k-1)*m \qquad \text{Equation (4)},$$

where k is the number of data chunks and m is the number of coding chunks. A real-life example comprising a 10+2 configuration can yield eighteen chunks to be replicated. After zone B $200_B$ creates another chunk (e.g., a chunk G), it can be used to form a new group of data chunks together with old chunks A, C, and D. The new group can also be protected with GEO erasure coding once again.

Figure 6:
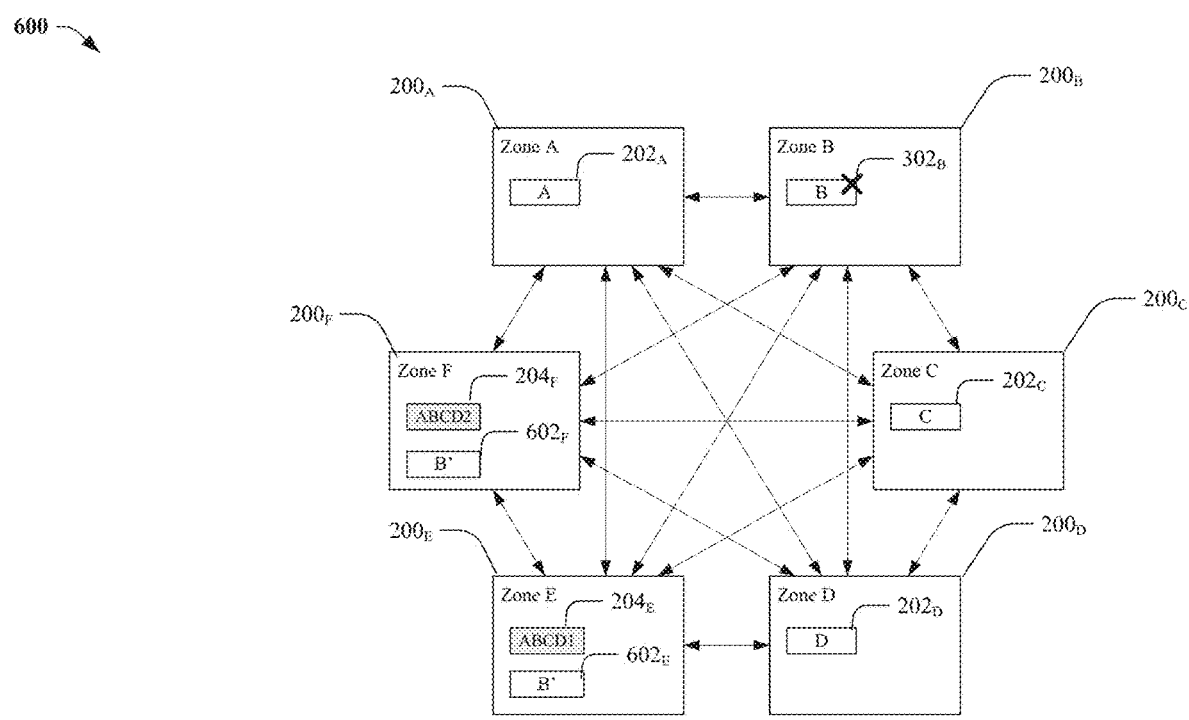
FIG. 6 illustrates an example system that facilitates repeated replication of a chunk to delete.

FIG. 6, there illustrated is an example system 600 that facilitates repeated replication of a chunk to delete. Based on a request to delete data from the server 100, the data chunk B $302_B$ can be deleted (e.g., via the deletion component 104) from zone B $200_B$. At zone E $200_E$ and zone F $200_F$, the data can be in the form of a data chunk that has previously been combined with other data chunks to create coding chunks ABCD1 $204_E$ and ABCD2 $204_E$. The server 100 can also create additional data chunks at a remote zone by replicating data chunks (e.g., via the replication component 102) from various other zones to yield B' $602_E$ and B' $602_F$.

In order to replicate a data chunk via the replication component 102, the server 100 can replicate, at the zone comprising the coding chunks, the data chunk that has been marked for deletion by the deletion component 104. Thus, in this case, the server 100 replicates B $302_B$ at zone E $200_E$ and zone F $200_F$ because it has been marked for deletion.

Figure 7:
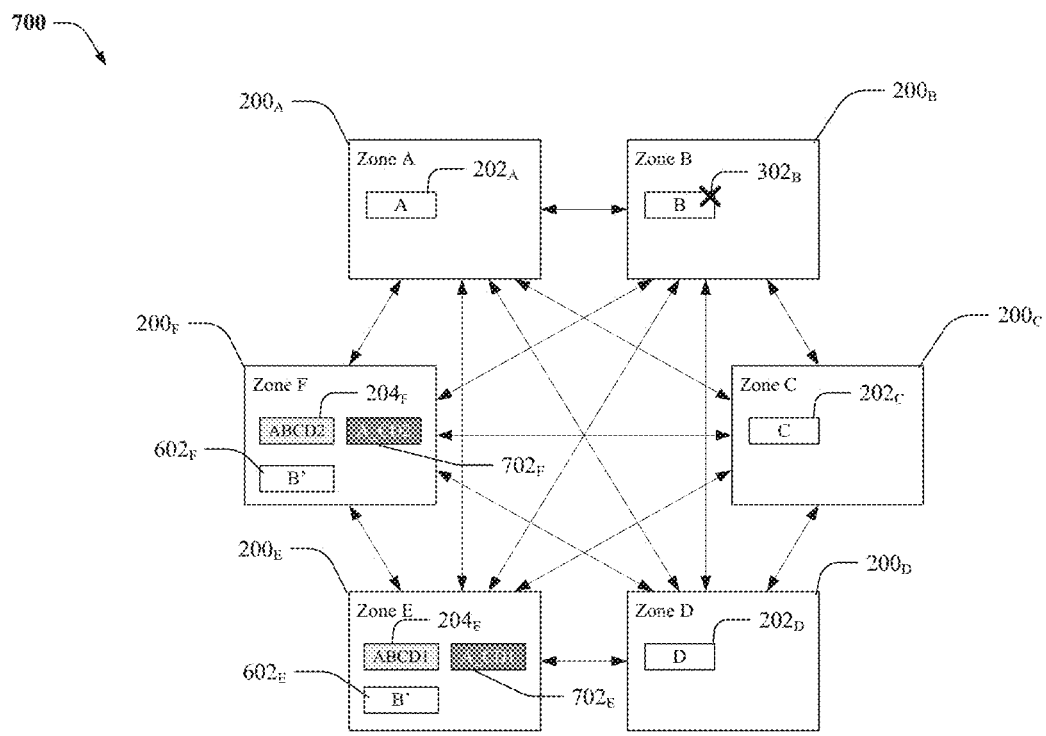
FIG. 7 illustrates an example system that facilitates creation of partial coding chunks.

Referring now to FIG. 7, there illustrated is an example system that facilitates creation of partial coding chunks. After the server 100 has replicated chunk B $302_B$ as B' at zone E $200_E$ and zone F $200_F$, as discussed in FIG. 6, partial coding chunks A_CD1 $702_E$ and A_CD1 $702_F$ can be generated (e.g., via the creation component 106), wherein the partial coding chunks do not comprise the data chunk (e.g., B $302_B$) that was replicated to zone E $200_E$ and zone F $200_F$. For example, zone E $200_E$ can use its coding chunk ABCD1 $204_E$ and the copy of chunk B $302_B$ (e.g., B' $602_E$) to create and store the partial coding chunk A_CD1 $702_F$. zone F acts similarly.

Figure 8:
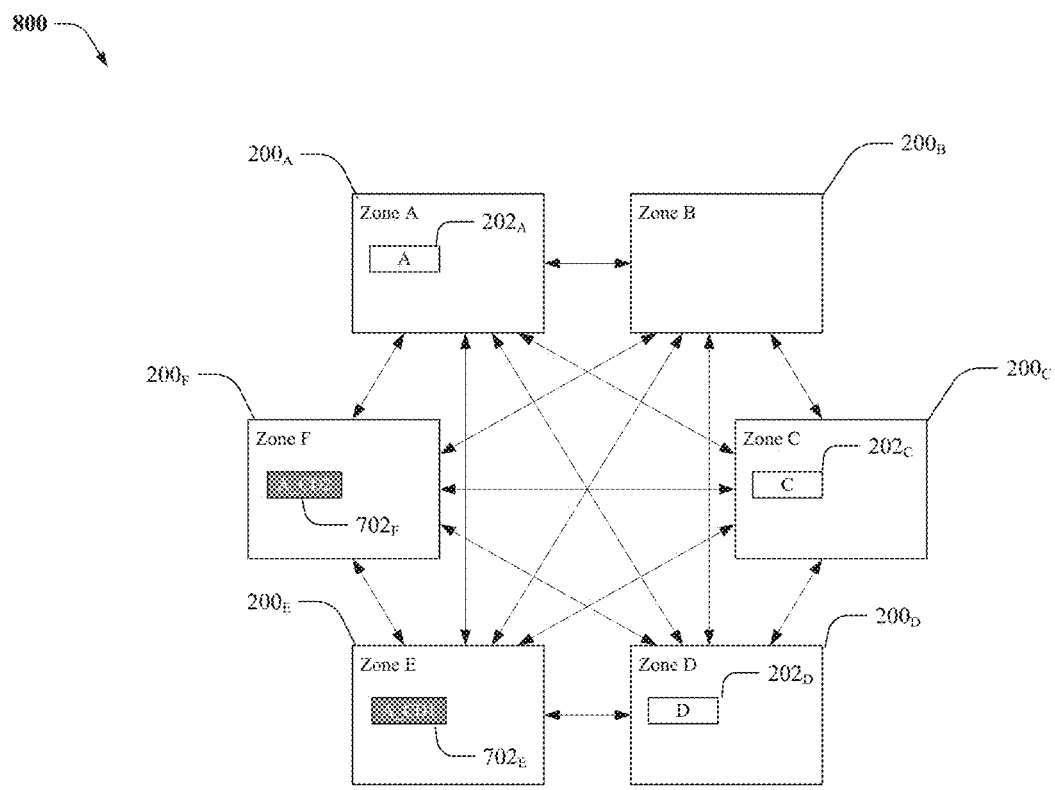
FIG. 8 illustrates an example data layout after deletion of a chunk.

FIG. 8 illustrates an example data layout 800 after deletion of a chunk. After the partial coding chunks A_CD1 $702_E$ and A_CD1 $702_F$ have been created (e.g., via the creation component 106) the original coding chunks ABCD1 $204_E$ and ABCD2 $204_E$ and the replicated data chunks B' $602_E$ and B' $602_F$ can be deleted from zone E $200_E$ and zone F $200_F$ (e.g., via the deletion component 104).

Figure 9:
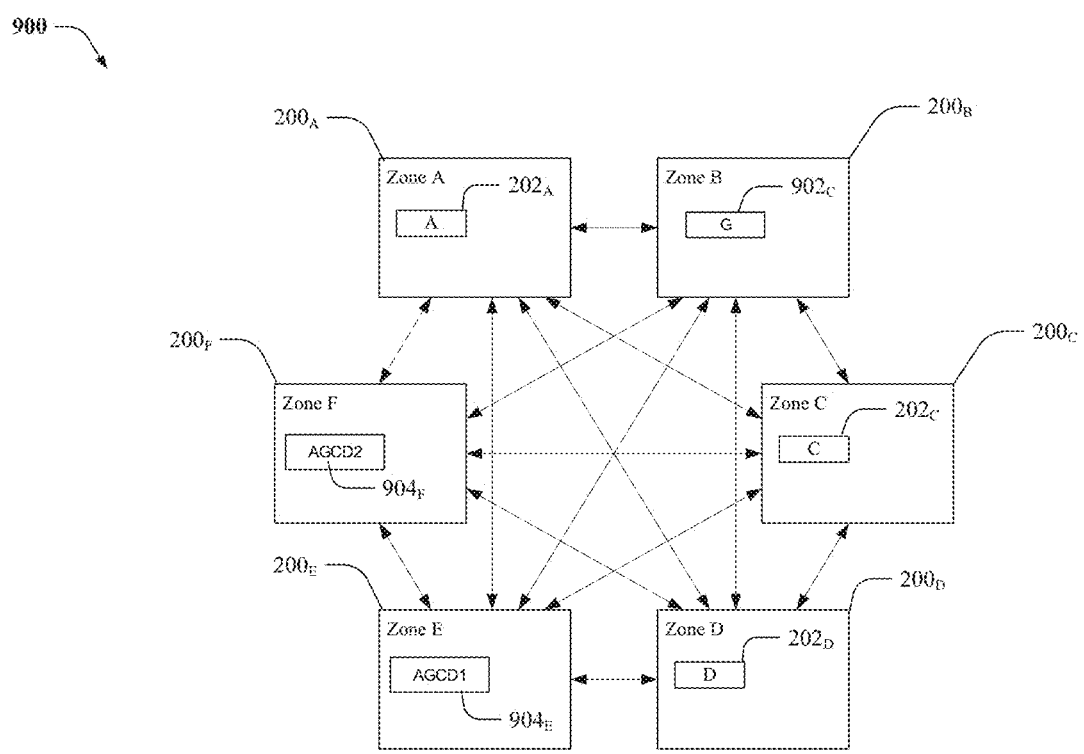
FIG. 9 illustrates an example data layout after replacement of a chunk with another chunk.

FIG. 9 illustrates an example data layout 900 after replacement of a data chunk with another data chunk. After the replicated data chunks B' $602_E$ and B' $602_F$ and the two coding chunks ABCD1 $204_E$ and ABCD2 $204_E$ are deleted, the distributed system contains three remaining data chunks A $202_A$, C $202_C$, and D $202_D$, and the two partial coding chunks A_CD1 $702_E$ and A_CD1 $702_F$ created for them. Consequently, after zone B $200_B$ creates another data chunk (e.g., chunk G $902_B$), chunk G $902_B$ can be used to make the partial coding chunks A_CD1 $702_E$ and A_CD1 $702_F$ complete again (e.g., AGCD1 $904_E$ and AGCD2 $904_F$).

Therefore, the proposed methodology for geographically distributed storage can reduce inter-zone network traffic, whereby only two data chunks (i.e., 2 copies of 1 chunk) have been transferred between the zones versus six data chunks being transferred via another methodology. Generally, the number of data chunks to transfer is m, i.e. the number of coding chunks. For example, for the erasure coding scheme 10+2 it is still 2, the transferred data chunks would only be two as opposed to eighteen.

Figure 10:
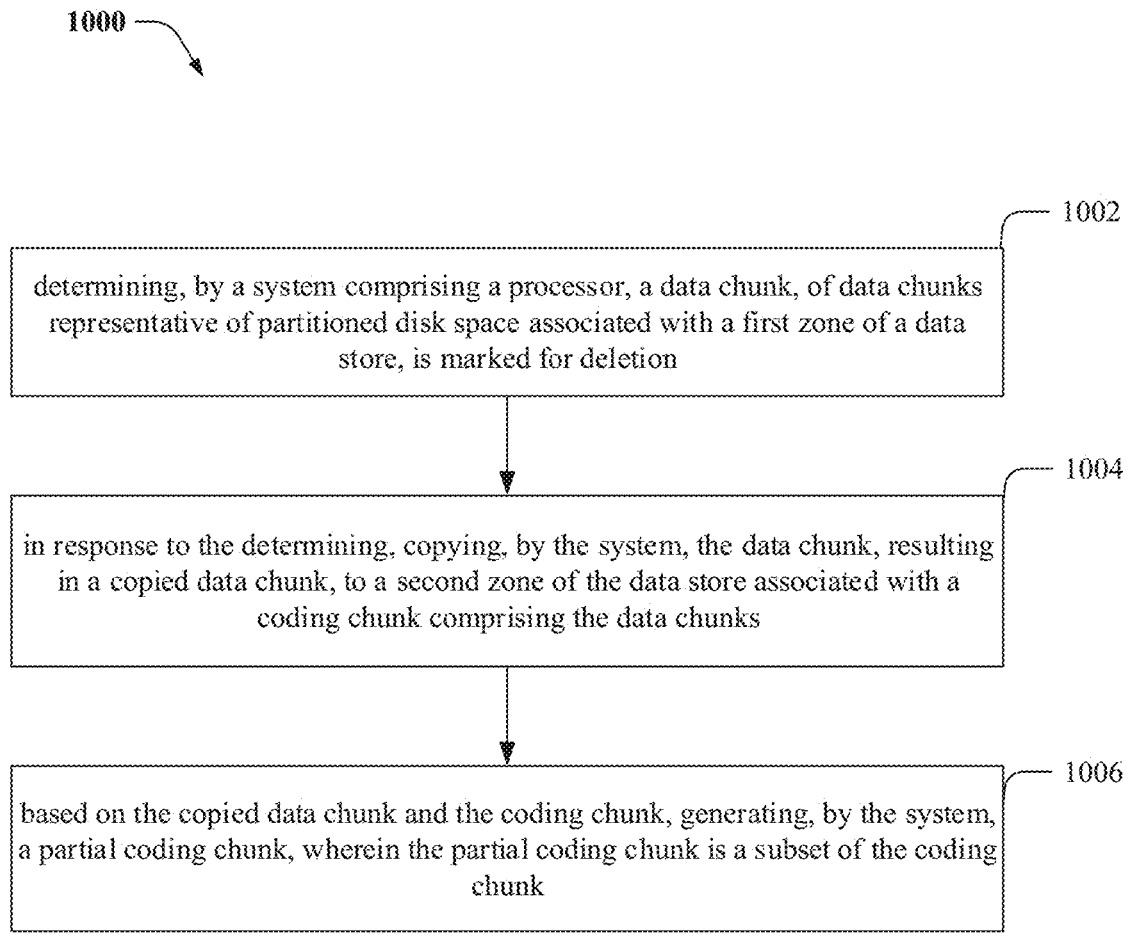
FIG. 10 illustrates an example method that facilitates distributed erasure coding.

Referring now to FIG. 10, there illustrated is an example method 1000 that facilitates distributed erasure coding. At element 1002, the method can comprise determining a data chunk, of data chunks representative of partitioned disk space associated with a first zone of a data store is marked for deletion (e.g., via the deletion component 104). In response to the determining, at element 1004, the method can comprise copying (e.g., via the replication component 102) the data chunk, resulting in a copied data chunk, to a second zone of the data store associated with a coding chunk comprising the data chunk. Additionally, based on the copied data chunk and the coding chunk, at element 1006, the method can comprise generating (e.g., via the creation component 106) a partial coding chunk, wherein the partial coding chunk is a subset of the coding chunk.

Figure 11:
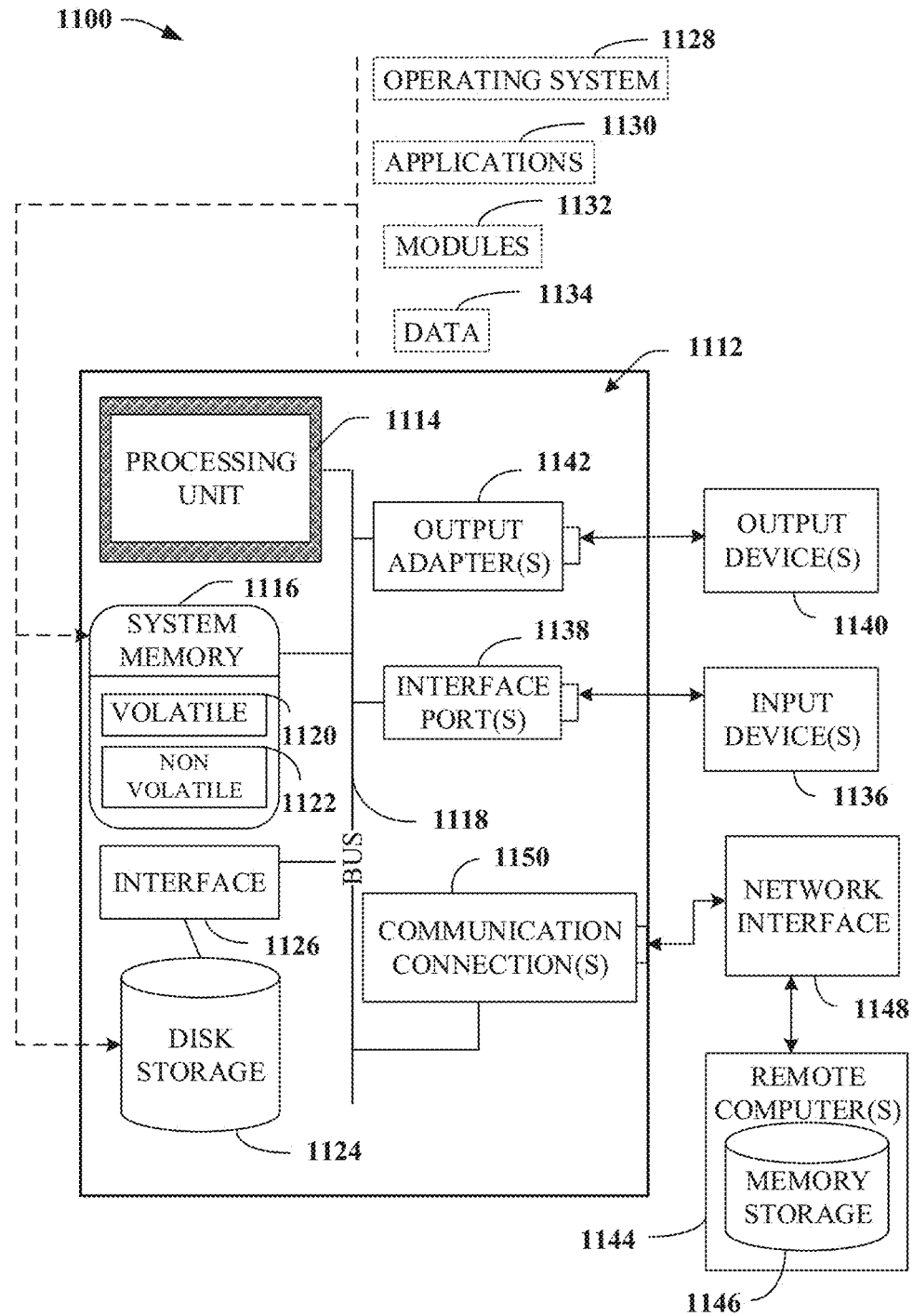
FIG. 11 illustrates a block diagram of an example computer operable to execute the data deletion for distributed erasure coding.

Referring now to FIG. 11, there is illustrated a block diagram of an example computer operable to execute the data deletion for distributed erasure coding. In order to provide additional context for various aspects of the disclosed subject matter, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, (e.g., a carrier wave or other transport mechanism), and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, radio frequency (RF), infrared and other wireless media.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, minicomputing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 11, a block diagram of a computing system 1100, e.g., server 302, operable to execute the disclosed systems and methods is illustrated, in accordance with an embodiment. Computer 1112 comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 comprises volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can comprise ROM, PROM, EPROM, EEPROM, or flash memory. Volatile memory 1120 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also comprises removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 comprise, for example, a serial port, a parallel port, a game port, a universal serial bus (USB), a wireless based port, e.g., Wi-Fi, Bluetooth, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 comprise, by way of illustration and not limitation, video and sound devices, cards, etc. that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically comprises many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically and/or wirelessly connected via communication connection 1150. Network interface 1148 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

The computer 1100 is operable to communicate with any wireless devices or entities operatively disposed in wireless communication, e.g., desktop and/or portable computer, server, communications satellite, etc. This includes at least WiFi and Bluetooth® wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 5 GHz radio band at an 54 Mbps (802.11a) data rate, and/or a 2.4 GHz radio band at an 11 Mbps (802.11b), an 54 Mbps (802.11g) data rate, or up to an 600 Mbps (802.11n) data rate for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations In the subject specification, terms such as "data store," data storage," "database," "cache," and substantially any other information storage component relevant to operation and functionality of a component, refer to "memory components," or entities embodied in a "memory" or components comprising the memory. It is noted that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Furthermore, the terms "user," "consumer," "client," and the like are employed interchangeably throughout the subject specification, unless context warrants particular distinction(s) among the terms. It is noted that such terms can refer to human entities or automated components/devices supported through artificial intelligence (e.g., a capacity to make inference based on complex mathematical formalisms), which can provide simulated vision, sound recognition and so forth.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via the server 100, to dynamically perform operations as described herein.

A classifier can be a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   copying, by a system comprising a processor, a data chunk, of data chunks representative of partitioned disk space associated with a first zone of a data store that is marked for deletion, resulting in a copied data chunk, to a second zone of the data store associated with a coding chunk comprising the data chunks; and
   based on the copied data chunk and the coding chunk, generating, by the system, a partial coding chunk, wherein the partial coding chunk is a subset of the coding chunk.

2. The method of claim 1, wherein the operations further comprise:
   combining, by the system, an un-encoding erasure coding operation and the partial coding chunk.

3. The method of claim 1, wherein the copied data chunk is a first copied data chunk, wherein the coding chunk is a first coding chunk, and wherein the method further comprises:
   copying, by the system, a second copied data chunk, to a third zone associated with a second coding chunk comprising the data chunk.

4. The method of claim 3, wherein the partial coding chunk is a first partial coding chunk, and further comprising:
   based on the second copied data chunk and the second coding chunk, generating, by the system, a second partial coding chunk.

5. The method of claim 1, further comprising:
   in response to the generating the partial coding chunk, deleting, by the system, the data chunk associated with the first zone.

6. The method of claim 1, wherein the data chunk is a first data chunk, and further comprising:
   generating, by the system, a second data chunk associated with the first zone to replace the first data chunk.

7. The method of claim 6, wherein the copied data chunk is a first copied data chunk, and further comprising:
   copying, by the system, the second data chunk to the second zone to complete the partial coding chunk, resulting in a second copied data chunk.

8. A system, comprising:
   a processor; and
   a memory that stores executable instructions that, when executed by the processor, facilitate performance of operations, comprising:
      in response to receiving an indication that a data chunk, of data chunks representative of apportioned disk space associated with a first zone of a data store, is to be deleted, sending a copy of the data chunk to a second zone associated with a coding chunk comprising the data chunks; and
      based on the copy of the data chunk and the coding chunk, generating a partial coding chunk without the data chunk, wherein the partial coding chunk is a subset of the coding chunk.

9. The system of claim 8, wherein the operations further comprise:
   replacing the coding chunk with a virtual coding chunk.

10. The system of claim 9, wherein the operations further comprise:
    in response to the replacing, deleting the copy of the data chunk during an un-encoding operation.

11. The system of claim 8, wherein the partial coding chunk is generated, by a distributed storage device, from a complete coding chunk of the second zone.

12. The system of claim 8, wherein the generating comprises an un-encoding operation for deletion of the data chunk of the first zone.

13. The system of claim 12, wherein the un-encoding operation is performed by the first zone in parallel to the second zone.

14. The system of claim 8, wherein the operations further comprise:
    in response to the second zone storing the partial coding chunk, deleting the copy to reduce inter-zone traffic between the first zone and the second zone.

15. The system of claim 8, wherein the operations further comprise:
    in response to the second zone storing the partial coding chunk, deleting the coding chunk to reduce inter-zone traffic between the first zone and the second zone.

16. A non-transitory computer-readable storage medium comprising instructions that, in response to execution, cause a server device comprising a processor to perform operations, comprising:
    based on request to delete a data chunk, of data chunks, associated with a first zone of a data store, facilitating generating a copy of the data chunk to be sent to a second zone associated with a coding chunk, wherein the coding chunk comprises the data chunks;
    facilitating sending the copy of the data chunk to the second zone; and
    in response to the facilitating the sending the copy of the data chunk to the second zone, facilitating generating a partial coding chunk, wherein the partial coding chunk is different than the coding chunk.

17. The non-transitory computer-readable storage medium of claim 16, wherein the generating the partial coding chunk comprises extracting the data chunk from the coding chunk.

18. The non-transitory computer-readable storage medium of claim 16, wherein the operations further comprise:
    in response to the generating the partial coding chunk, deleting the data chunk to reduce inter-zone traffic between the first zone and the second zone.

19. The non-transitory computer-readable storage medium of claim 16, wherein the operations further comprise:
    in response to the generating the partial coding chunk, deleting the copy of the data chunk to reduce inter-zone traffic between the first zone and the second zone.

20. The non-transitory computer-readable storage medium of claim 16, wherein the generating the partial coding chunk comprises an un-encoding operation to be performed by zones concurrently.

* * * * *